(12) United States Patent
Schwarzbich

(10) Patent No.: US 9,074,614 B2
(45) Date of Patent: Jul. 7, 2015

(54) TOLERANCE COMPENSATION MEMBER

(71) Applicant: Jörg Schwarzbich, Bielefeld (DE)

(72) Inventor: Jörg Schwarzbich, Bielefeld (DE)

( * ) Notice: Subject to any disclaimer, the term of this patent is extended or adjusted under 35 U.S.C. 154(b) by 272 days.

(21) Appl. No.: 13/678,754

(22) Filed: Nov. 16, 2012

(65) Prior Publication Data

US 2013/0315658 A1 Nov. 28, 2013

(30) Foreign Application Priority Data

Nov. 18, 2011 (DE) ...................... 20 2011 052 036 U

(51) Int. Cl.
*F16B 5/00* (2006.01)
*F16B 5/02* (2006.01)
*F16B 37/08* (2006.01)

(52) U.S. Cl.
CPC ............... *F16B 5/00* (2013.01); *Y10T 403/459* (2015.01); *Y10T 403/75* (2015.01); *F16B 5/0233* (2013.01); *F16B 5/0266* (2013.01); *F16B 37/0842* (2013.01)

(58) Field of Classification Search
CPC ...... F16B 5/0216; F16B 5/0233; F16B 5/025; F16B 5/0266; F16B 5/0628; F16B 37/12; F16B 5/0283; F16B 37/0842
USPC .......... 403/168, 192, 229, 342, 350; 411/535, 411/546, 251, 438, 549
See application file for complete search history.

(56) References Cited

U.S. PATENT DOCUMENTS

| | | | | |
|---|---|---|---|---|
| 2,121,784 A * | 6/1938 | Busby | ............................ | 411/105 |
| 2,575,311 A * | 11/1951 | Barry, Jr. et al. | ............... | 411/111 |
| 2,630,733 A * | 3/1953 | Higgins | ........................ | 411/438 |
| 3,018,684 A * | 1/1962 | Brancato | ..................... | 411/366.3 |
| 3,121,453 A * | 2/1964 | Modrey | ......................... | 411/103 |
| 3,880,041 A * | 4/1975 | Markowski et al. | ............ | 411/34 |
| 4,318,651 A * | 3/1982 | Ragen | ........................... | 411/342 |
| 4,581,871 A * | 4/1986 | Blucher et al. | .................. | 52/681 |
| 4,645,398 A * | 2/1987 | Cosenza et al. | ................ | 411/438 |
| 4,712,955 A * | 12/1987 | Reece et al. | ..................... | 411/17 |
| 5,098,241 A * | 3/1992 | Aldridge et al. | .............. | 411/433 |
| 5,288,191 A * | 2/1994 | Ruckert et al. | ................ | 411/432 |
| 5,340,258 A | 8/1994 | Simon | | |
| 5,409,323 A * | 4/1995 | Greene | ......................... | 403/343 |
| 6,238,123 B1 | 5/2001 | Schwarzbich | | |
| 6,494,659 B1 | 12/2002 | Lutkus et al. | | |
| 6,543,956 B2 | 4/2003 | Schwarzbich | | |
| 6,585,447 B2 | 7/2003 | Schwarzbich | | |
| 6,669,424 B1 * | 12/2003 | Bauer | ........................... | 411/433 |

(Continued)

FOREIGN PATENT DOCUMENTS

DE 3524309 C2 8/1988
DE 29807967 U1 10/1999

(Continued)

*Primary Examiner* — Daniel P Stodola
*Assistant Examiner* — Matthew R McMahon
(74) *Attorney, Agent, or Firm* — Richard M. Goldberg

(57) ABSTRACT

A tolerance compensation member having at least two support bodies (20, 22) at least one of which has a helically extending support surface with which the support bodies are engaged one against the other such that an axial dimension of the tolerance compensation member (12) may be adjusted by rotating the support bodies (20, 22) relative to one another, wherein at least one of the support bodies is a helical spring (20), and the support body (22) that is engaged therewith has a lug (26) that engages between the turns of the helical spring (20).

10 Claims, 3 Drawing Sheets

(56) References Cited

U.S. PATENT DOCUMENTS

| | | | |
|---|---|---|---|
| 6,688,830 B2 * | 2/2004 | Kluting | 411/546 |
| 6,907,961 B2 * | 6/2005 | Allen et al. | 188/67 |
| 7,226,263 B2 | 6/2007 | Schwarzbich | |
| 7,441,980 B2 | 10/2008 | Leitermann et al. | |
| 7,509,778 B2 | 3/2009 | Leek | |
| 8,016,532 B2 * | 9/2011 | Park | 411/251 |
| 8,202,033 B2 * | 6/2012 | Choi et al. | 411/546 |
| 2007/0140810 A1 * | 6/2007 | Itou et al. | 411/251 |

FOREIGN PATENT DOCUMENTS

| | | |
|---|---|---|
| DE | 202006012493 U1 | 12/2006 |
| EP | 0840021 A1 | 11/1996 |
| EP | 0955479 B1 | 11/1999 |
| EP | 1180605 A1 | 6/2001 |
| EP | 1215401 A2 | 11/2001 |
| EP | 1510701 A1 | 8/2004 |

* cited by examiner

Fig. 3
Fig. 4
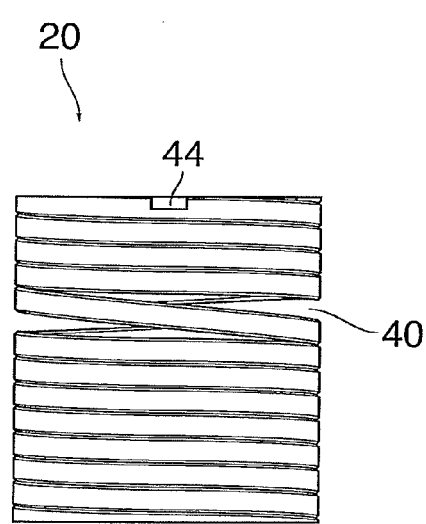
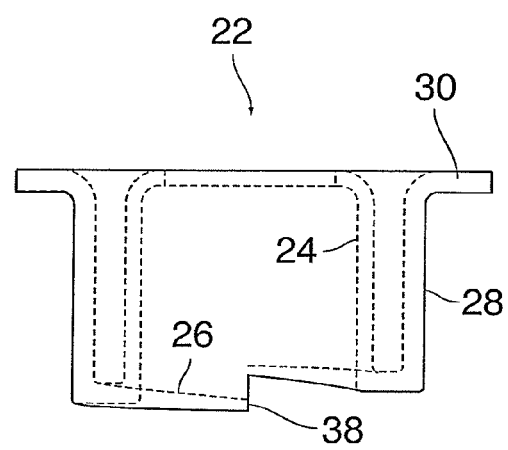

TOLERANCE COMPENSATION MEMBER

BACKGROUND OF THE INVENTION

The invention relates to a tolerance compensation member having at least two support bodies one of which has a helically extending support surface with which the support bodies are engaged one against the other such that an axial dimension of the tolerance compensation member can be adjusted by rotating the support bodies relative to one another.

Examples for tolerance compensation members of this type have been described in DE 298 07 967 U1, EP 1 180 605 A1 and EP 1 215 401 A2.

These tolerance compensation members are used in particular for connecting and tensioning two structural components by means of a connecting screw that is inserted through the annular support bodies. One of the support bodies is engaged with the connecting screw via a friction coupling so that, when the connecting screw is screwed into one of the two structural components to be connected, it is entrained frictionally and thereby rotated relative to the other support body. In this way, the axial dimension of the tolerance compensation member increases in the course of the screw-in process until the tolerance compensation member bridges the gap between the two components. Then, the friction coupling permits the connecting screw to be screwed-in further whereas the two support bodies are retained in their position relative to one another.

In the known tolerance compensation members, at least two of the support bodies are in a thread-engagement with one another, e.g. via left handed threads.

SUMMARY OF THE INVENTION

It is an object of the invention to provide a tolerance compensation member that can be manufactured more easily and at lower costs.

According to the invention, in order to achieve this object, at least one of the support bodies is a helical spring, and the support body engaged thereat has a lug that engages between the turns of the helical spring.

Thus, the helically extending support surface is formed by the windings of the helical spring. Consequently, it is not necessary to form this support surface by thread cutting or by machining the support body.

Useful details of the invention are indicated in the dependent claims.

In a preferable embodiment, the helical spring is configured such that its turns are in block engagement with one another in the non-loaded state of the spring. Consequently, when the lug of the other support body engages between the turns and presses them apart, the turns exert an elastic force onto the lug which is thereby clampingly held between the turns. This offers the possibility to store and transport the tolerance compensation member in a defined pre-mounted condition without the risk that the relative position of the two support bodies is changed, e.g. due to vibrations during transport.

The support body that cooperates with the helical spring can be manufactured at low costs as a non-machined molded member or as a drawn part, e.g., in the shape of a pot that is accommodated inside the helical spring at least with a part of its length and has a lug projecting radially outwards, or in the shape of a sleeve that surrounds the helical spring and has a lug radially projecting inwards. These two variants may also be combined with one another so that the lug connects a pot inside the helical spring with a sleeve surrounding the same. Optionally, the support body may also be a sintered body.

The lug may in itself have a helical shape and may for example form one or more complete turns. The axial adjustment range of the tolerance compensation member may be limited by stops in one direction or in both directions. Preferably, the stops are arranged such that they limit the relative rotary movement of the support bodies.

Whereas the support bodies are preferably made of metal so that they are able to transmit a large supporting force, it is possible that one end of one or both support bodies is embedded or insert-molded in a plastic fitting which facilitates the mounting of the tolerance compensation member to one of the components to be connected and/or to protect the components to be connected against becoming scratched.

According to a further development of the invention, it is also conceivable to provide a multi-stage tolerance compensation member with three or more support bodies of which at least one is configured as a helical spring. In this case it is possible that two helical springs which are directly supported at a respective one of the structural components, one being a left handed helical spring and the other being a right handed helical spring, are non-rotatably locked against one another and/or against the respective structural components, whereas a rotatable third support body engages with lugs between the turns of the two helical springs.

BRIEF DESCRIPTION OF THE DRAWINGS

An embodiment example will now be described in conjunction with the drawings, wherein:

FIG. 3 is a view of a support body configured as a helical spring; and

FIG. 4 is a view of a pot-shaped support body that cooperates with the helical spring of FIG. 3.

DETAILED DESCRIPTION

Figure 1:
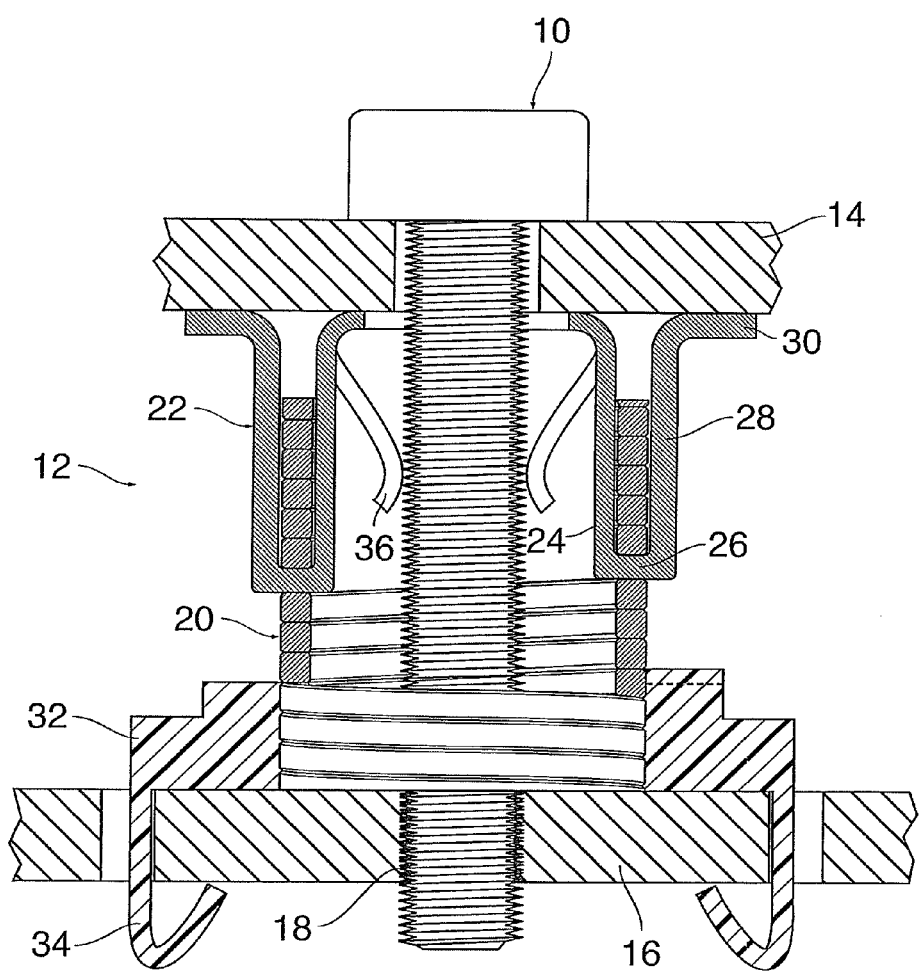
FIG. 1 is an axial section of a connecting device having a tolerance compensation member according to the invention.

FIG. 1 shows a connecting device that comprises a connecting screw 10 and a tolerance compensation member 12 and serves for connecting a first structural component 14 with a second structural component 16 such that a spacing exists between them.

The connecting screw 10 is inserted through a bore of the first component 14 and screwed into a threaded bore 18 of the second component 16. The tolerance compensation member 12 serves as a spacer between the components 14, 16. It has a support body which is configured as a helical spring 20 and is supported on the second component 16, and another support body 22 which is configured as a pot-shaped drawn part and is supported on the first component 14.

In the example shown the support body 22 has a pot-shaped internal part 24 that is accommodated in the helical spring 20 with a part of its length and has at its lower end a lug 26 that projects radially outwards and extends helically in circumferential direction and connects the internal part 24 to a sleeve 28 that surrounds the helical spring. The sleeve 28 forms at its top end an outwardly directed flange 30 that is flush with the bottom of the internal part 24 and is supported at the first component 14.

In the example shown, the helical spring 20 is a left handed spring wound from a wire that has a rectangular or square cross-section with rounded or chamfered edges. When the helical spring is not under tension, the turns thereof engage one another in block fashion. When the connecting screw 10 is tightened, it engages the first structural component 14 with its head and draws the second component 16 against the lower end (in FIG. 1) of the helical spring 20 which is supported with its blocked turns on the lug 26 of the support body 22 which itself is supported on the first component 14. In this way, the two components 14, 16 can be firmly tensioned one against the other with a spacing that is defined by the axial dimension of the tolerance compensation member 12.

In the example shown, the lower end of the helical spring 20 is insert-molded into a plastic fitting 32 which may also fill the interior of the lower part of the helical spring and has elastic clips 34 with which the fitting 32 and, therewith, the insert-molded helical spring 20 can be held non-rotatably at the second component 16.

Figure 2:
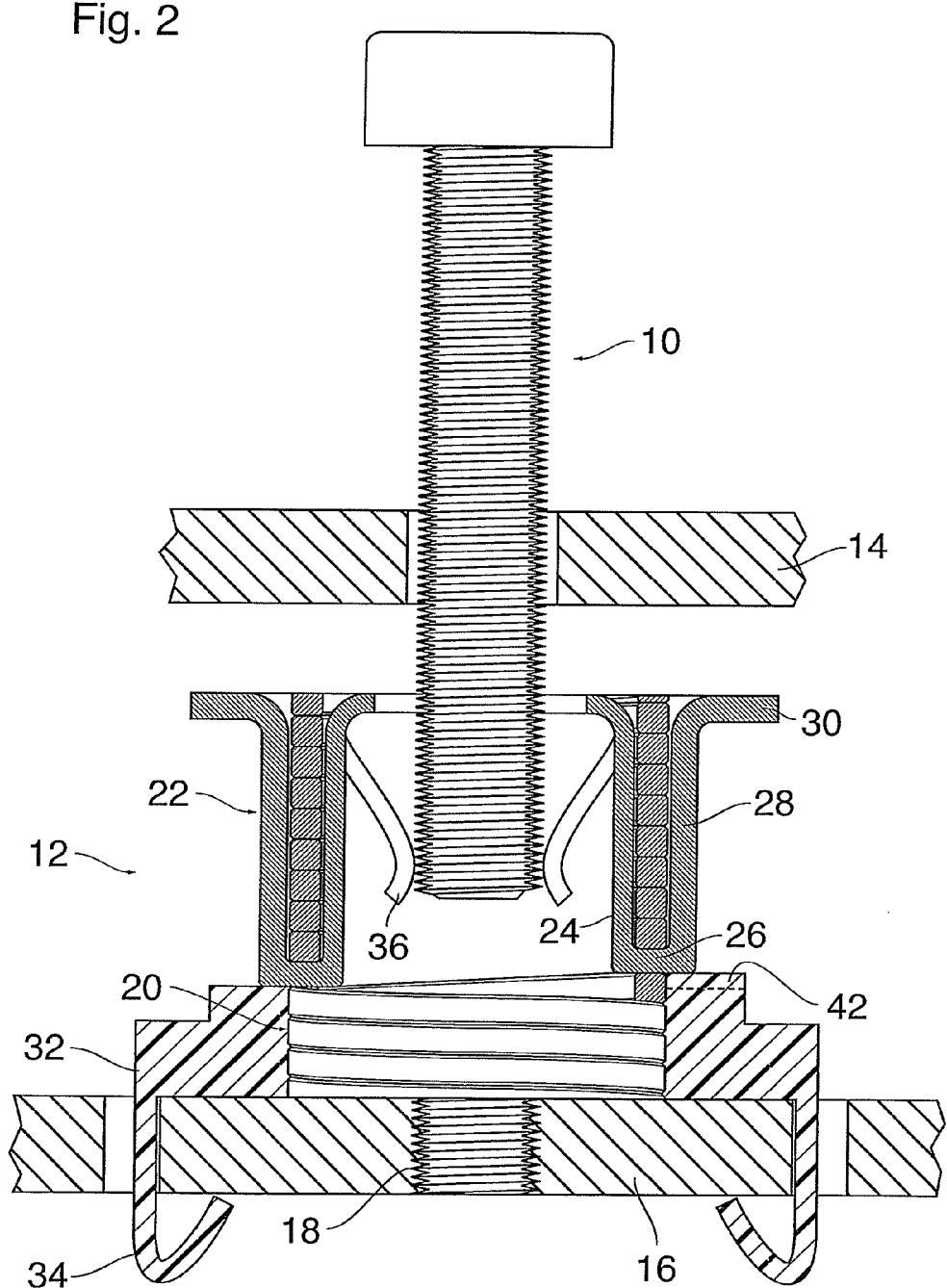
FIG. 2 shows the connecting device of FIG. 1 in a condition before the connection is established.

FIG. 2 shows the connecting device in a condition during the mounting process. The tolerance compensation member 12 is secured to the second component 16 by means of the clips 34. Here, the support body 22 has been screwed further into the helical spring 20 and is in a lower extreme position in which its lug 26 engages the fitting 32. In this condition, the top end of the helical spring 20 is flush with the top surface of the flange 30 and the bottom of the internal part 24. The helical spring 20 is milled at both ends such that it forms plane end faces essentially on its entire periphery. The lower end of the helical spring 20 is therefore, on its entire circumference, in full-faced engagement with the top surface of the second component 16.

In FIG. 2, the first component 14 is still spaced apart from the tolerance compensation member 12. The connecting screw 10 has been inserted through the component 14 and through a bore in the bottom of the internal part 24 and into the support body 22. Two elastic tongues 36 that are in elastic engagement with the external thread of the connecting screw 10 have been bent out of the peripheral wall of the internal part 24. In this way, the support body 22 is held in friction contact with the connecting screw 10.

In the further course of the mounting process, the connecting screw 10 is inserted further until it comes into thread-engagement with the threaded bore 18. Subsequently, the connecting screw is screwed into the threaded bore 18 while the tongues 36 assure that the support body 22 is entrained in rotary direction whereas the helical spring 20 is held non-rotatably by the fitting 32. In this way, the support body 22 is rotated relative to the helical spring 20, so that its lug 26 follows the left handed turns of the helical spring, with the result that the support body 22 is screwed out of the helical spring 20 and approaches the first component 14. When, finally, the flange 30 engages the first component 14 and, consequently, the support body 22 cannot be screwed-out further, the tongues 36 permit the connecting screw 10 to slip, so that the latter may be screwed-in further until its head firmly tightens the first component 14 against the tolerance compensation member 12.

In FIGS. 3 and 4, the helical spring 20 and the pot-shaped support body 22 have been shown in a respective lateral view. The helical spring 20 has been shown in the condition that it would assume when the support body 22 had been screwed in.

In FIG. 4, it can be seen that the lug 26 extends helically and forms exactly one turn, so that a step 38 is formed at one point of its circumference.

In FIG. 3, it can be seen that the turns of the helical spring 20 are pressed apart at those points where the lug 26 passes through, so that a gap 40 is formed there between the neighboring turns. On the back side of the helical spring that faces away from the viewer in FIG. 3, the gap 40 as a constant width, whereas, on the front side that is visible in FIG. 3, it tapers in wedge shape at both ends. The thickness of the lug 26 varies in a corresponding way. On an arc of 180° that is situated on the side facing away from the viewer in FIG. 4, the lug 26 has a constant thickness. On the side that faces the viewer in FIG. 4, it forms two arcs of 90° which taper towards the step 38 in wedge shape until the thickness is reduced to approximately one half of the original thickness.

This configuration of the lug 26 makes it easier to screw the support body 22 into the helical spring 20. To that end, the topmost turn of the helical spring 20 is slightly lifted with a sharp tool. Thanks to the chamfer or rounding of the profile of the wire, the tool can easily penetrate between the turns. When the topmost turn of the wire has been lifted, the lug 26 may be inserted with its wedge-shaped tapered end into the gap between the two topmost turns of the helical spring and may then be screwed-in deeper by further rotation.

When the support body 22 has been screwed-in completely and assumes the position shown in FIG. 2, the step 38 abuts at a stop 42 that is formed in the fitting 32 and has been symbolized by a dashed line in FIG. 2 (but may in practice be located in a different angular position). This prevents the support body 22 from being screwed-in further, so that the support body 22 is held in a defined position in which its top end is flush with the top end of the helical spring 20. At the same time, it is assured that the support body 22 is not tightened too firmly in the helical spring 20, so that the friction contact of the tongues 36 is sufficient for rotating the support body 22 in screw-out direction when the connecting screw 10 is screwed-in.

As can further be seen in FIG. 3, the helical spring has a notch 44 in the top side of its topmost turn. When the fitting 32 is molded around the lower end of the helical spring 20, the spring is held by a tool (not shown) which has a lug that engages in the notch 44. In this way, it can be assured that the helical spring 20 has a reproducible angular position relative to the fitting 32.

Depending upon the direction in which the connecting screw 10 is inserted and screwed in, it is also possible to conceive embodiments in which the helical spring is a right handed spring.

The invention claimed is:

1. A tolerance compensation member for connecting together two structural components in a spaced apart manner, said tolerance compensation member comprising at least two support bodies, at least one of which has a helically extending support surface with which the support bodies are engaged one against the other such that an axial dimension of the tolerance compensation member is adapted to be adjusted by rotating the support bodies relative to one another, and wherein at least one of the support bodies is a helical spring, and another said support body that is engaged therewith is a pot shaped drawn part which is separate from said two structural elements, and that has a non-corrugated cylindrical peripheral wall extending along an inner perimeter of the helical spring, and a lug that is formed at an end of the peripheral wall at an outer circumference of the peripheral wall and engages between turns of the helical spring, and wherein a sleeve is formed at an outer periphery of the lug and surrounds an outer perimeter the helical spring.

2. The tolerance compensation member according to claim 1, wherein the turns of the helical spring, when unloaded, are blocked one against the other.

3. The tolerance compensation member according to claim 1, wherein the helical spring is wound from a wire that has a rectangular cross-section.

4. The tolerance compensation member according to claim 3, wherein the rectangular cross-section wire has one of:
  rounded corners and
  chamfered corners.

5. The tolerance compensation member according to claim 1, wherein the lug extends helically, correspondingly with the turns of the helical spring.

6. The tolerance compensation member according to claim 5, wherein the lug forms at least one complete helix turn.

7. The tolerance compensation member according to claim 5, wherein the lug is tapered in thickness in a wedge shape at least at one end.

8. The tolerance compensation member according to claim 1, wherein the helical spring is a left handed helical spring.

9. A tolerance compensation member according to claim 1, wherein the cylindrical peripheral wall has inwardly projecting elastic tongues.

10. The tolerance compensation member according to claim 1, wherein an outer end of at least one of the support bodies is embedded in a plastic fitting.

* * * * *